United States Patent
Kato

(10) Patent No.: US 7,159,981 B2
(45) Date of Patent: Jan. 9, 2007

(54) PROGRESSIVE REFRACTIVE POWER LENS

(75) Inventor: Kazutoshi Kato, Minamiminowa-mura (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 10/504,967

(22) PCT Filed: Feb. 17, 2004

(86) PCT No.: PCT/JP2004/001742

§ 371 (c)(1),
(2), (4) Date: Aug. 18, 2004

(87) PCT Pub. No.: WO2004/074907

PCT Pub. Date: Sep. 2, 2004

(65) Prior Publication Data

US 2005/0099596 A1  May 12, 2005

(30) Foreign Application Priority Data

Feb. 19, 2003  (JP) ............................. 2003-041780

(51) Int. Cl.
  *G02C 7/06* (2006.01)
  *G02C 7/10* (2006.01)
(52) U.S. Cl. ..................... 351/169; 351/168; 351/164
(58) Field of Classification Search ................ 351/168, 351/169
  See application file for complete search history.

(56) References Cited

U.S. PATENT DOCUMENTS

| | | | | |
|---|---|---|---|---|
| 4,640,593 A | * | 2/1987 | Shinohara | .................... 351/169 |
| 5,892,565 A | * | 4/1999 | Ueno et al. | ................. 351/169 |
| 6,086,203 A | * | 7/2000 | Blum et al. | ................. 351/169 |
| 6,505,934 B1 | * | 1/2003 | Menezes | ..................... 351/169 |
| 6,964,478 B1 | * | 11/2005 | Welk et al. | ................. 351/169 |

* cited by examiner

*Primary Examiner*—Jordan Schwartz
*Assistant Examiner*—Jessica Stultz
(74) *Attorney, Agent, or Firm*—Sughrue Mion, PLLC

(57) ABSTRACT

It has been difficult to manufacture an inside surface progressive-power lens which is as thin as an outside surface progressive-power lens due to a limited configuration of an object-side refractive surface of the inside surface progressive-power lens. However, a thin progressive-power lens with less blur and distortion can be provided at a reduced cost by forming its object-side refractive surface from an aspherical surface which is symmetric with respect to a rotational axis and has a smaller curvature at a distance reference point than that at a near reference point, and by forming an eyeball-side refractive surface from a combination of a progressive surface, an astigmatic refraction surface and an "as-worn" corrective aspherical surface.

24 Claims, 13 Drawing Sheets

OBJECGT-SIDE REFRACTIVE SURFACE
EYEBALL-SIDE REFRACTIVE SURFACE

PRIOR ART

PRIOR ART

PRIOR ART

PROGRESSIVE REFRACTIVE POWER LENS

TECHNICAL FIELD

A progressive-power lens of the present invention pertains to a progressive-power spectacle lens chiefly for a person having poor accomoddation.

BACKGROUND ART

A basic structure of a progressive-power lens is first described with reference to FIG. 8. The progressive-power lens comprises a distance portion having refracting power (power) for distant view, a near portion having power for near view, and an intermediate portion which is disposed between the distance and near portions and progressively varies its power. The power difference between the distance portion and the near portion is known as addition power, which is set at an appropriate value according to the level of accommodation of a wearer of glasses. There are also a pair of aberration portions, which are not suitable for optical use, with the intermediate and the near portions on their sides interposed between the aberration regions. These aberration regions produced by smoothly connecting the power difference between the distance and near portions inevitably exist in a progressive-power lens as its drawback. A spectacle lens also consists of an object-side refractive surface and an eyeball-side refractive surface as illustrated in FIG. 9.

A typical progressive-power lens has measuring points at which respective power for distant and near views are measured. These points are specified by a lens manufacturer and are in general clearly shown on a refractive surface of a lens by printing or other method as illustrated in FIG. 10. When these points are not printed, the measuring points or other signs can be detected from permanent marks attached to the lens in accordance with the specifications of the manufacturer. The points for measuring the power for distant view and near view are referred to as a distance reference point and a near reference point, respectively.

As illustrated in FIG. 11, the refractive surface, which is known as a progressive surface and causes addition power peculiar to progressive power, often lies on the object-side refractive surface. In this case, the eyeball-side refractive surface is formed from a spherical surface or a toric surface with an orientation corresponding to that of a cylinder axis in accordance with a prescribed dioptric power of the wearer of the glasses. This type of the progressive-power lens is referred to as an outside surface progressive-power lens in this description. The outside surface progressive-power lens has a refractive surface for varying image magnification at the object side, which enlarges image distortion. Thus, some people who use the progressive-power lens for the first time or who have replaced a differently designed progressive-power lens with the outside surface progressive-power lens may have a sense of incongruity.

In order to prevent image distortion caused by variations in image magnification, a lens known as an inside surface progressive-power lens has been recently commercialized in which the progressive surface is disposed at the eyeball side as disclosed in WO97/19382 (FIGS. 4, 10 and 15). As illustrated in FIG. 12, the inside surface progressive-power lens has a complicated curved-surface configuration in which the object-side refractive surface is formed from a spherical surface or an aspherical surface symmetric with respect to a rotational axis and the eyeball-side refractive surface is from a combination of progressive surface, a toric surface and a corrective aspherical element for correcting off-axis aberration of the lens.

As described in WO97/19383 (FIG. 1), there has been developed and commercially manufactured another type of lens known as a both-surface progressive-power lens which is formed by dividing addition power element of its progressive surface between an object-side refractive surface and an eyeball-side refractive surface. Since the object-side refractive surface includes a part of the progressive surface element for varying magnification, the both-surface progressive-power lens causes larger distortion than the inside surface progressive-power lens having the object-side refractive surface formed from a spherical surface. Of course, the both-surface progressive-power lens causes less distortion than the outside surface progressive-power lens.

As illustrated in FIG. 12, the inside surface progressive-power lens gains addition power by giving curvature difference between the distance portion and the near portion of the eyeball-side refractive surface. The curvature of the near portion is smaller than that of the distance portion such that the near portion power is greater than the distance portion power. The surface whose curvature is zero has an infinite radius of curvature (=1/curvature), i.e., a flat shape. When the curvature is negative, there fractive surface at the eyeball side is convex toward the eyeball. This is undesirable in view of manufacture, since a curved surface having a concave at the distance portion and a convex at the near portion requires a more complicated processing technique than the curved surface having concaves at both distance and near portions. Thus, the curvature at the near portion needs to be established within a range in which it does not become negative. In this description, the center of the radius of curvature lies closer to the eyeball than to the curved surface when the curvature is positive, and the center of the radius of curvature lies closer to the object than to the curved surface when the curvature is negative, though no distinction between positive and negative is conventionally made for a curvature.

The minimum curvature at the near portion of the eyeball-side refractive surface has been determined because of its processing limitation. For example, a surface having a radius of curvature larger than 1.5 m cannot be processed due to the restriction of a processing machine. Thus, the curvature at the near portion of the eyeball-side refractive surface (=1/radius of curvature) is approximately 0.67 $m^{-1}$. When a refractive index n of a lens base material is 1.67, a surface power at this curvature can be calculated by a formula of (n−1) X (curvature), obtaining a value of approximately $0.45^{-1}$. The power is conventionally shown in dioptre (D=$m^{-1}$), which unit will be used hereinafter in view of convenience for the calculation of power. The above surface power is thus expressed as 0.45 D.

The surface power at the distance portion must be larger than that at the near portion by the amount equivalent to the addition power which is to be gained by the inside curved surface. For obtaining addition power of 3.00 D, for example, the distance surface power needs to be 3.45 D when the near surface power is 0.45 D. For obtaining the distance portion power of +3.00 D for this lens, the surface power of the object-side refractive surface needs to be 6.45 D as the surface power at the distance portion of the eyeball-side refractive surface is 3.45 D. In general, the required surface power of the object-side refractive surface is slightly smaller than the above value, considering the effect of central thickness of the lens. However, the effect of central thickness is not taken into account herein for simplifying the explanation. The value of 6.45 D as the surface power corresponds to the radius of curvature 0.10 m=100 mm for the lens having a refractive index of 1.67. When the aperture of the lens is 70 mm, the height of the convex is approximately 6.3 mm.

Turning to the outside surface progressive-power lens having a progressive surface at the object side, the distance portion of the object-side refractive surface needs to have a surface power of 3.45 D so as to gain a distance portion power of +3.00 D if the eyeball-side refractive surface having a minimum surface power of 0.45 D is manufactured. The near portion is required to have a surface power of 6.45 D to obtain an addition power of 3.00 D. Thus, the radius of curvature of the object-side refractive surface reaches 0.19 m corresponding to the power of 3.45 D at the upper portion of the lens, and the radius of curvature gradually decreases toward the lower portion of the lens to reach 0.10 m corresponding to the power of 6.45 D at the near portion. The average value thus lies in the range between 3.45 D and 6.45 D, which makes the height of the convex smaller than that of the inside surface progressive-power lens as described. Conversely, the inside surface progressive-power lens is superior in view of optical characteristics such as less distortion, but is inferior in lens thickness and appearance.

In the both-surface progressive-power lens in which the object-side refractive surface has a part of the addition power, it can be easily understood that this lens possesses intermediate characteristics between the outside and inside surface progressive-power lenses. However, the both-surface progressive-power lens involves a higher manufacturing cost due to its complicated processes and longer processing time since the progressive surface is formed from freely curved surfaces having complicated configurations.

DISCLOSURE OF THE INVENTION

For providing a progressive-power lens which is made thin and manufactured at low cost while maintaining optical characteristics of-an inside surface progressive-power lens, a progressive-power lens according to the present invention comprises a distance portion, a near portion and an intermediate portion, wherein an object-side refractive surface is formed from a part of an aspherical surface symmetric with respect to a rotational axis and an eyeball-side refractive surface is from a progressive surface. The progressive-power lens is characterized in that there is a relationship shown below between a curvature $C1$ at a distance reference point of the object-side refractive surface and a curvature $C2$ at a near reference point of the object-side refractive surface:

$$C1 < C2$$

The progressive-power lens is further characterized in that there is a relationship shown below as to a curvature $C3$ at a portion outward from the near reference point of the object-side refractive surface:

$$C3 < C2$$

The progressive-power lens is further characterized in that the eyeball-side refractive surface is formed from a progressive surface to which an aspherical surface element for correcting "as-worn" optical characteristics is added.

The progressive-power lens is further characterized in that the aspherical surface element for correcting the optical characteristics at the distance portion is different from that element at the near portion.

The progressive-power lens is further characterized in that the aspherical surface element is established considering any one of a vertex distance at the wearing of glasses, a pantoscopic angle at the wearing of glasses and a working distance.

The progressive-power lens is further characterized in that the eyeball-side refractive surface is formed from a progressive surface to which an astigmatism-corrective element is added.

The progressive-power lens is further characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

The progressive-power lens is further characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

Industrial Applicability

The present invention is applicable to the manufacture of a refraction-corrective progressive-power spectacle lens, but its scope is not limited to this.

BEST MODE FOR CARRYING OUT THE INVENTION

Figure 1:
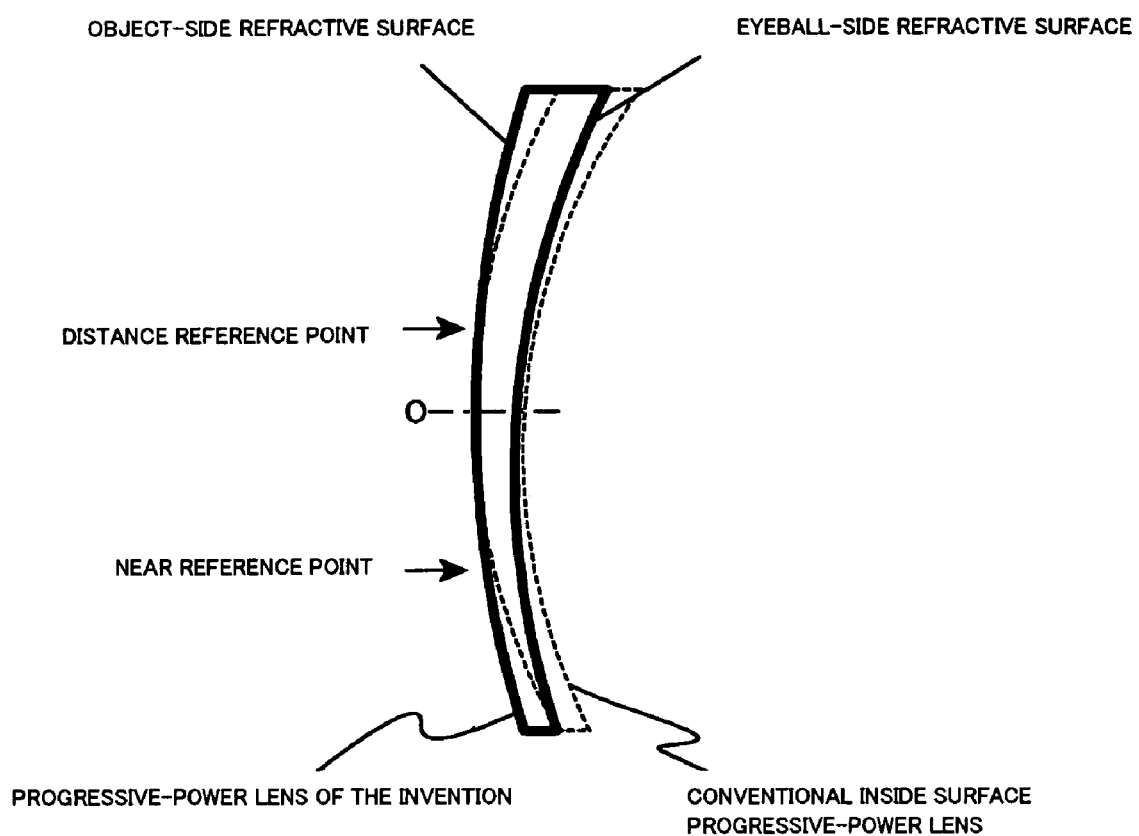
FIG. 1 illustrates a concept of a progressive-power lens according to the present invention.

FIG. 1 illustrates a concept of a progressive-power lens according to the present invention. The most prominent feature of the progressive-power lens of the invention lies at the point that its object-side refractive surface is aspherical and symmetric with respect to a rotational axis, having a smaller curvature $C1$ at a distance reference point than a curvature $C2$ at a near reference point.

$$C1 < C2 \tag{1}$$

As described here in before, in an inside surface progressive-power lens a curvature of an object-side refractive surface is determined according to a limited curvature at a near portion of its eyeball-side refractive surface. However, in an outside surface progressive-power lens curvatures at a distant portion and a near portion of an object-side refractive surface can be established differently from each other, which allows the curvatures to be determined such that the lens becomes flat. In the present invention, such an inside surface progressive-power lens is provided that can be made thin by establishing curvatures at a distance portion and a near portion of its object-side refractive surface differently from each other. The great difference between the progressive-power lens of the invention and a both-surface progressive-power lens is that the cost for manufacturing the former can be reduced due to its relatively simplified configuration of the object-side refractive surface which-is symmetric with respect to the rotational axis.

Figure 2:
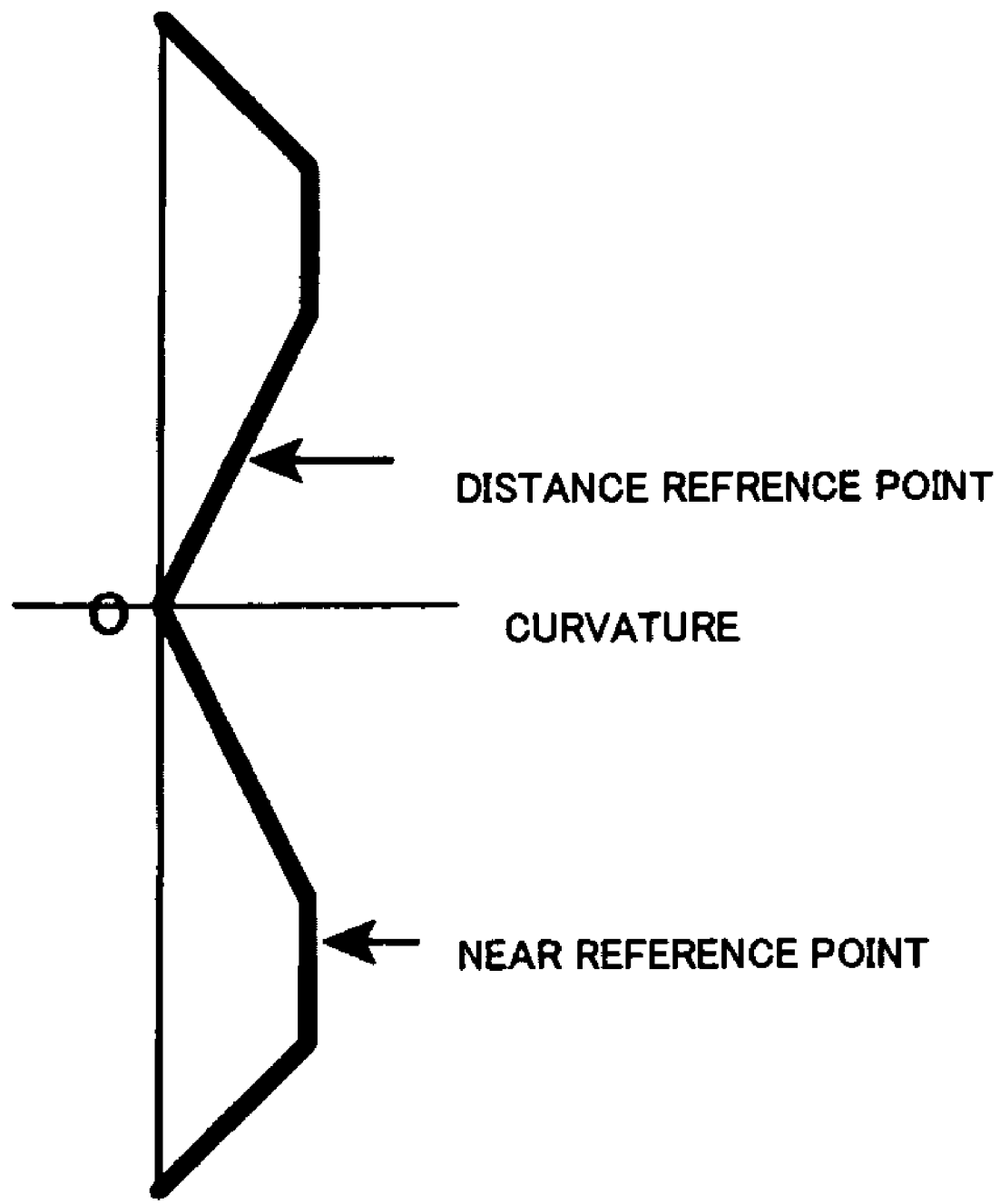
FIG. 2 shows curvature variation of a first embodiment according to the invention.

The present invention is now described in more detail. FIG. 2 shows curvature variation of an object-side refractive surface in a first embodiment. In this embodiment, an axis passing a geometrical center O of the lens corresponds to a symmetric axis for rotation. In the figure, the lateral axis indicates values of curvature, while the longitudinal axis indicates distance from the center of the lens. Thus, the upper portion in the figure shows the distance portion, whereas the lower portion shows the near and intermediate portions. The curvature variations are vertically symmetric with respect to the center O. The curvature at the distance reference point is smaller than that at the near reference point. For example, for manufacturing a lens having a distance power of 3.00 D and an addition power of 3.00 D, the surface power at the near portion of the eye-ball side refractive surface is set at the processing limit value of 0.45 D. As the lens having the distance power of 3.00 D and the addition power of 3.00 D has a near power of 6.00 D, the surface power at the near portion of the object-side refractive surface needs to be 6.45 D. When the refractive index of the lens n is 1.67, the curvature C2 at the near portion of the object-side refractive surface becomes 9.63 m$^{-1}$. The curvature C1 at the distance reference point is established at a smaller value than C2, for example, 8.13 m$^{-1}$ in this embodiment. This value corresponds to 5.45 D when converted into the surface power, which is just 1.00 D smaller than the surface power at the near reference point. The curvatures at the portions outward from the near reference point and in the vicinity of the rotational axis exhibit smaller values. It is thus easily understood that the average curvature at the convex side is smaller than 9.63 m$^{-1}$.

When the lens aperture is 75 mm in diameter, the height of the convex of the progressive-power lens in this embodiment is approximately 0.6 mm smaller than that of an inside surface progressive-power lens having a constant curvature of 9.63 m$^{-1}$ of its object-side refractive surface. The progressive-power lens of the embodiment is thus improved in appearance. Since the surface power at the distance portion of the object-side refractive surface is 5.45 D, the surface power at the distance portion of the eyeball-side refractive surface becomes 2.45 D. As the surface power at the near portion is 0.45 D, the surface power difference between the distance portion and the near portion of the eyeball-side refractive surface is as small as 2.00 D. As is known as a common sense for spectacle lens designers, image distortion decreases in the progressive surface as the surface power difference becomes smaller. The progressive-power lens of the invention is improved also in wearing comfortableness.

Figure 3:
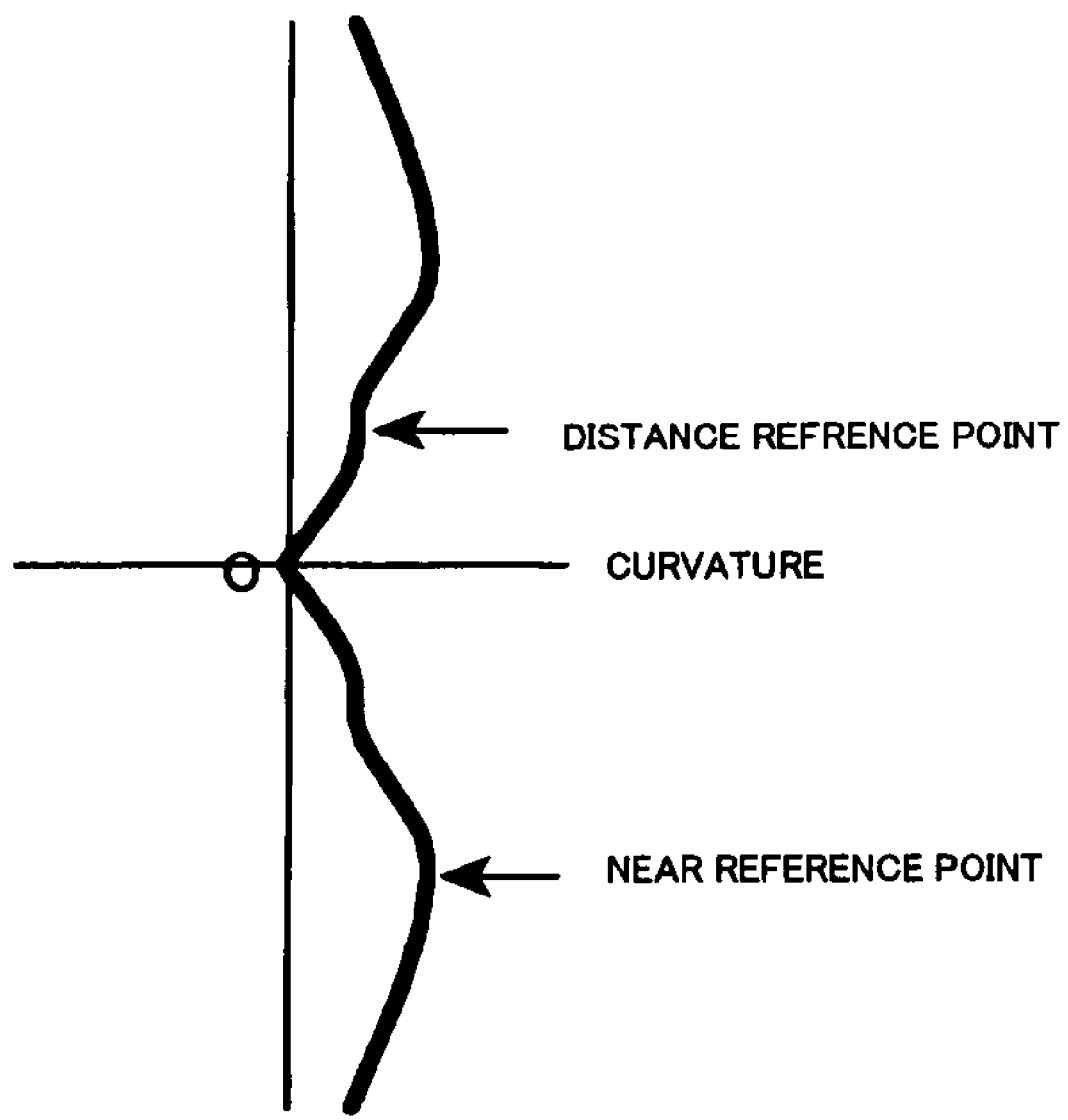
FIG. 3 shows curvature variation of a second embodiment according to the invention.

FIG. 3 illustrates curvature variation of an object-side refractive surface in a second embodiment. In this embodiment, constant curvatures are obtained in a range of 5 mm in diameter from the centers set at the distance and near reference points. The distance and near reference points correspond to the points at which the power is measured for examining lens specifications by means of a lens meter or other apparatus. Since the lens meter generally makes a measurement at the minimum aperture of 5 mm in diameter, a stable measurement of power can be taken by reducing the variations in curvature in this range. From the study of the writer of this description, the tolerance of the power sometimes exceeds the standard values specified in Japanese Industrial Standard and International Organization for Standardization when the curvature varies through 0.25 D in this range. Thus, it is desirable to confine the variations of the surface power within 0.25 D in the range of 5 mm in diameter from the centers set at the distance and near reference points. When $\Delta C1$ is the difference between the maximum and the minimum curvatures in the range of 5 mm in diameter from the center set at the distance reference point, the following relationship is obtained:

$$\Delta C1 \leq 0.25 \cdot (n-1) \tag{2}$$

wherein n indicates the refractive index of the lens base material.

Similarly, when $\Delta C2$ is the difference between the maximum and the minimum curvatures in the range of 5 mm in diameter from the center set at the near reference point, the following relationship is obtained:

$$\Delta C2 \leq 0.25 \cdot (n-1) \tag{3}$$

The above maximum and minimum curvatures can be easily calculated by applying a commonly used equation for curved surfaces to the data obtained through the three-dimensional geometric measurement at intervals such as 1 mm. The maximum and the minimum curvatures herein include not only those both at a single optional point within a predetermined portion as described, but also a combination of the maximum curvature at a point having the maximum curvature within the portion and the minimum curvature at another point having the minimum curvature within the portion. The difference between the maximum and the minimum curvatures at a single optional point causes astigmatism, while the difference between the maximum and minimum curvatures each at different points brings about variations in focal points within the portion. Both causes blurs of images, and should be eliminated as much as possible.

Figure 4:
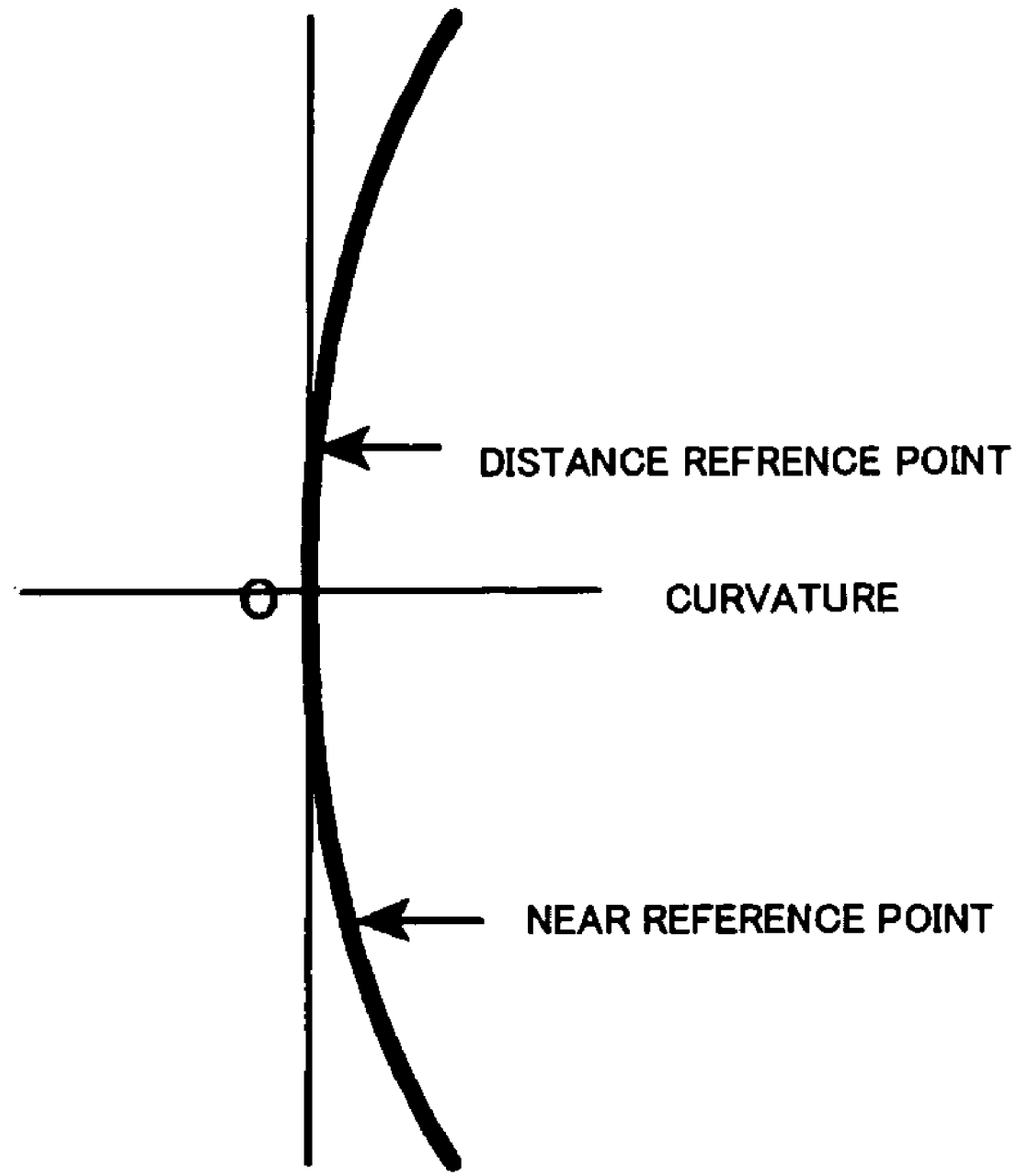
FIG. 4 shows curvature variation of a third embodiment according to the invention.

FIG. 4 illustrates curvature variation in a third embodiment. In this embodiment, monotonous increase in curvature from the rotational center till the outer periphery can be observed, providing lower improvement in lens thickness compared with the above-described embodiments. However, a highly simplified configuration of an object-side refractive surface allows the manufacturing cost to be reduced considerably.

Figure 5:
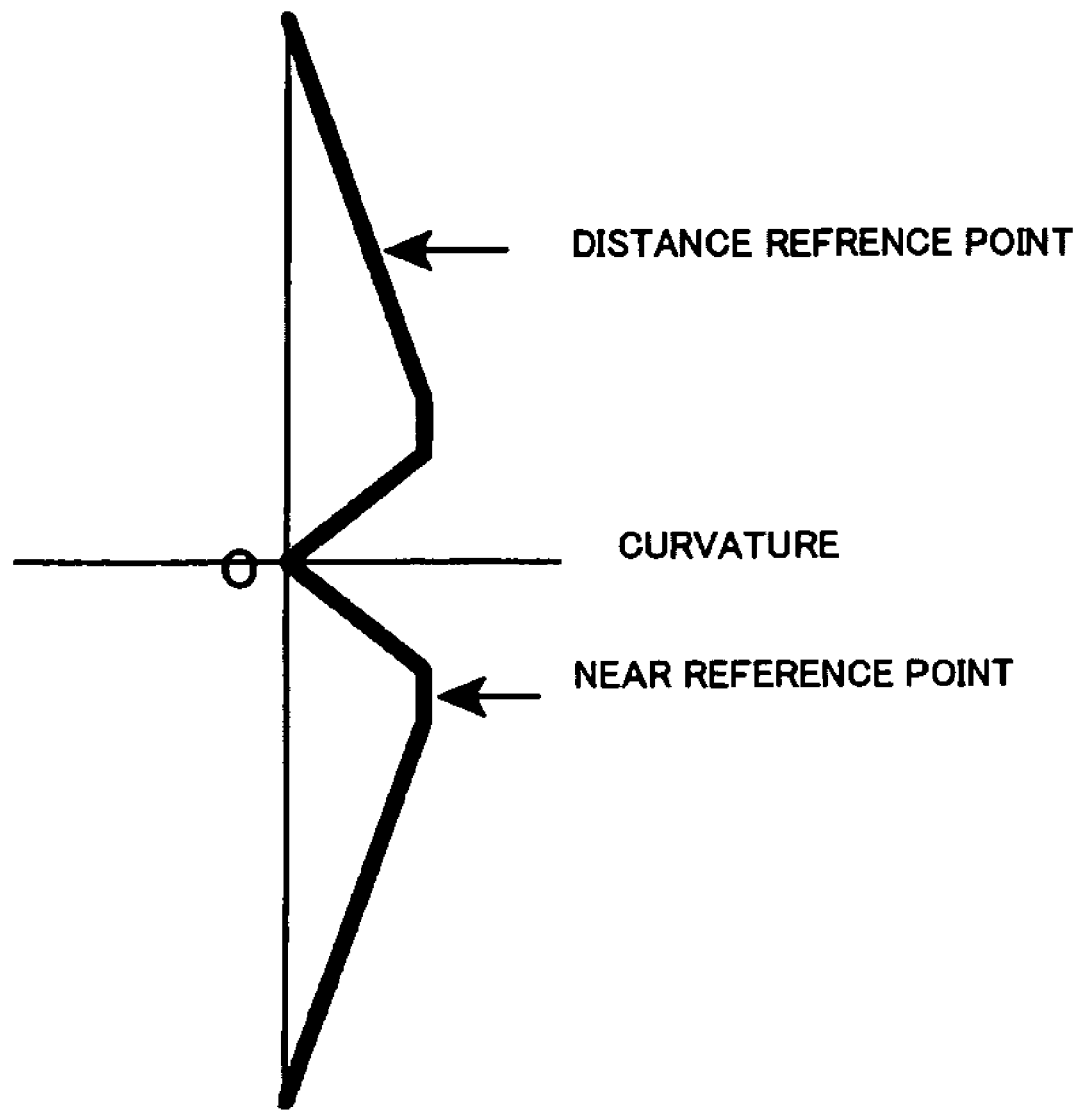
FIG. 5 shows curvature variation of a fourth embodiment according to the invention.

FIG. 5 shows curvature variation in a fourth embodiment. In this embodiment, a rotational center O is positioned closer to a near reference point than to a distance reference point. This example is applicable to a progressive-power lens which places greater emphasis on near views.

Figure 6:
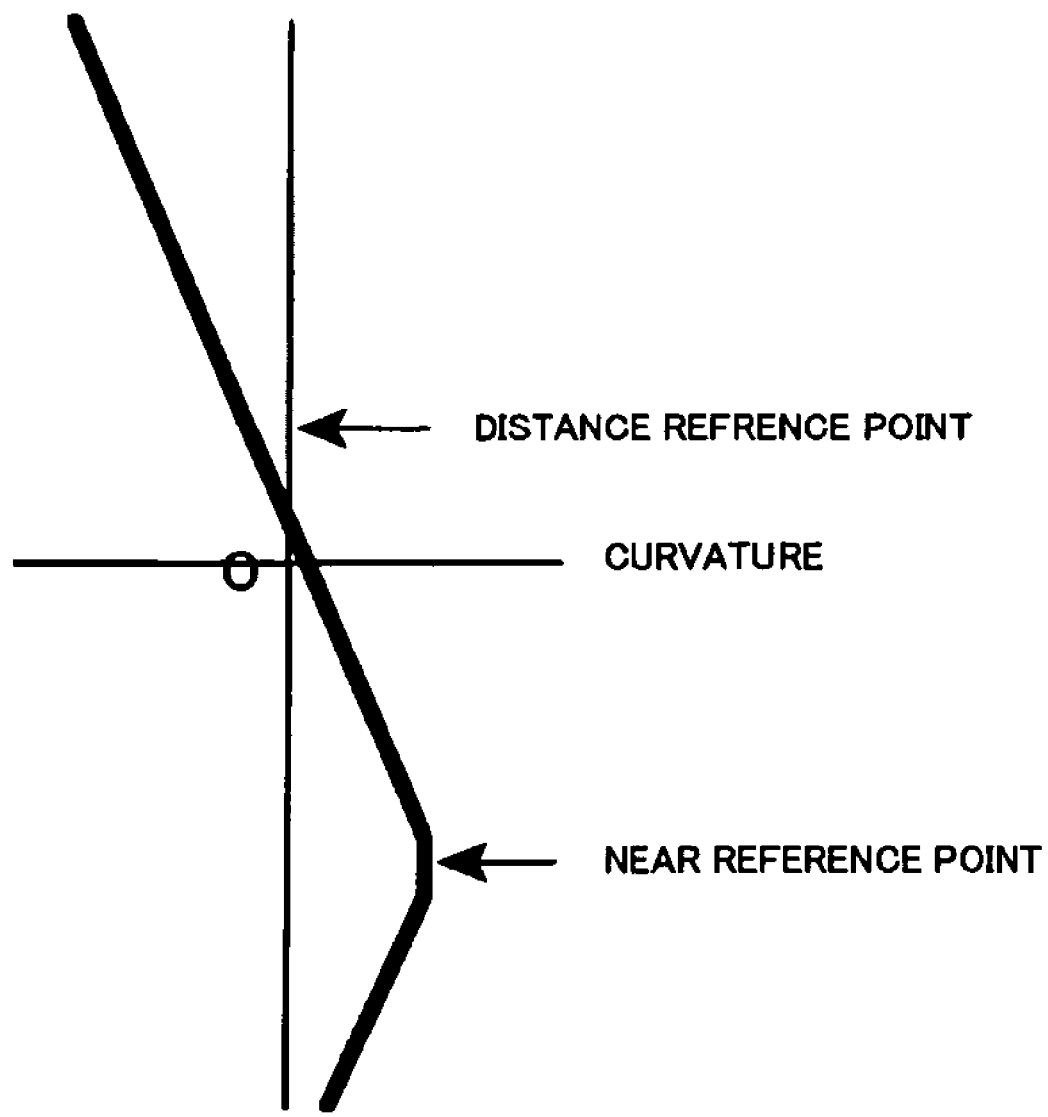
FIG. 6 shows curvature variation of a fifth embodiment according to the invention.
Figure 13:
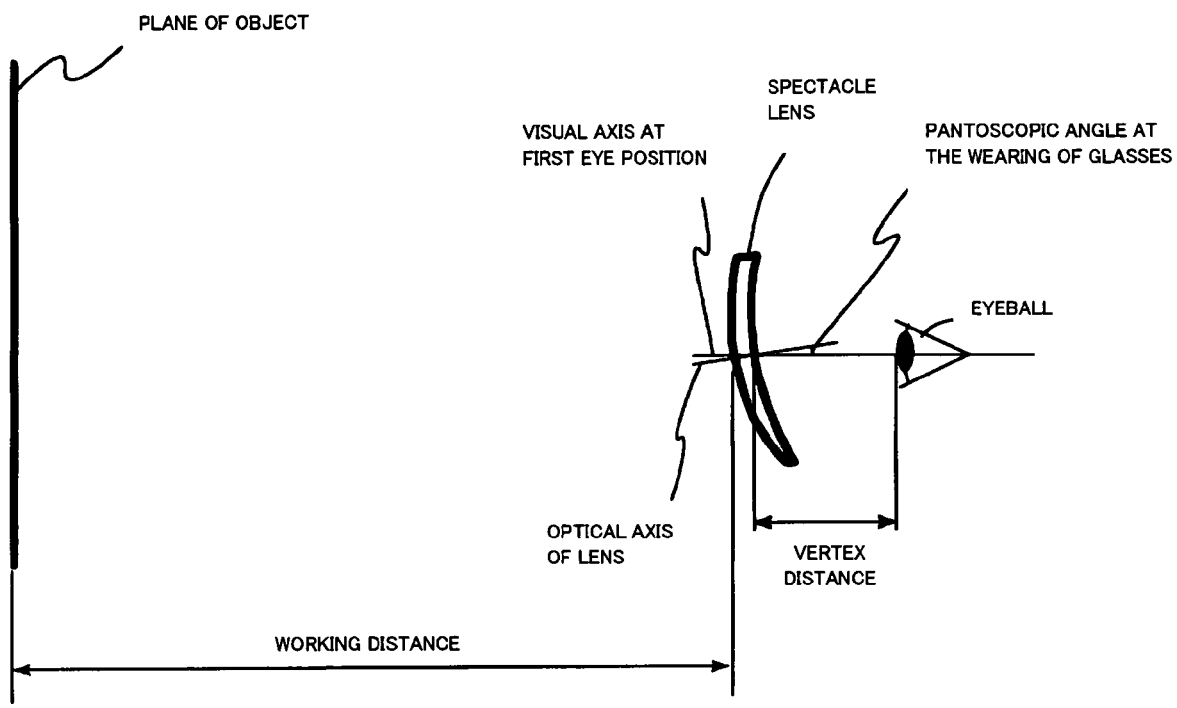
FIG. 13 is an explanatory view illustrating "as-worn" parameters.

FIG. 6 illustrates curvature variation in a fifth embodiment. In this embodiment, a rotational axis of an object-side refractive surface is so designed as to pass not a geometrical center O of the lens, but a near reference point. Since the rotational axis is not disposed at the geometrical center of the lens, higher technique may be required in forming the object-side refractive surface than in the above-described embodiments. However, curvatures can be made smaller in the area other than the near reference point and its vicinity, providing considerable improvement in lens thickness. Additionally, a corrective aspherical surface can be easily added to an eyeball-side refractive surface according to "as-worn" conditions of glasses (such as a vertex distance, a pantoscopic angle at the wearing of glasses and a working distance: see FIG. 13) due to the monotonous variations in curvature.

Figure 7:
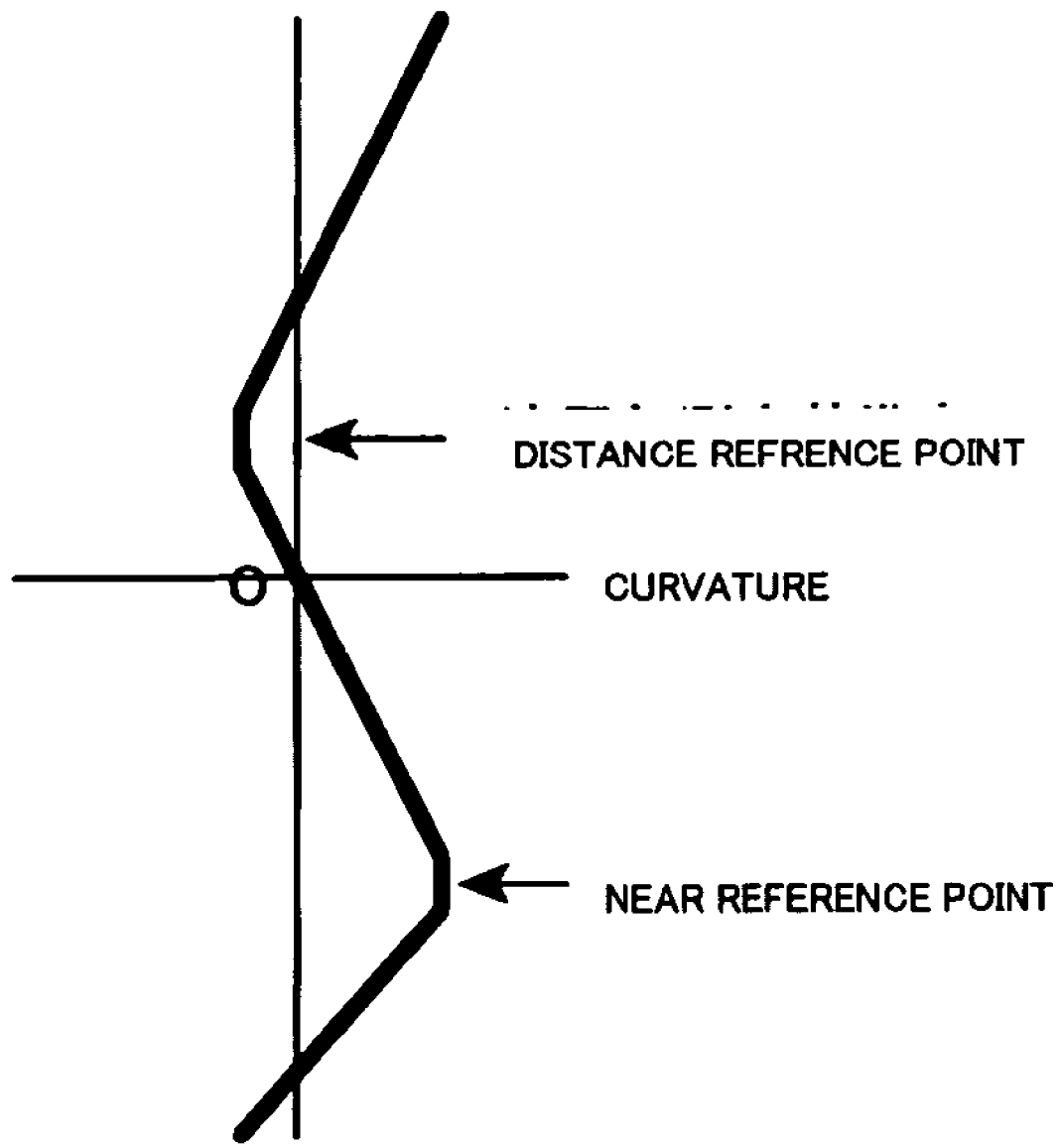
FIG. 7 shows curvature variation of a sixth embodiment according to the invention.
Figure 8:
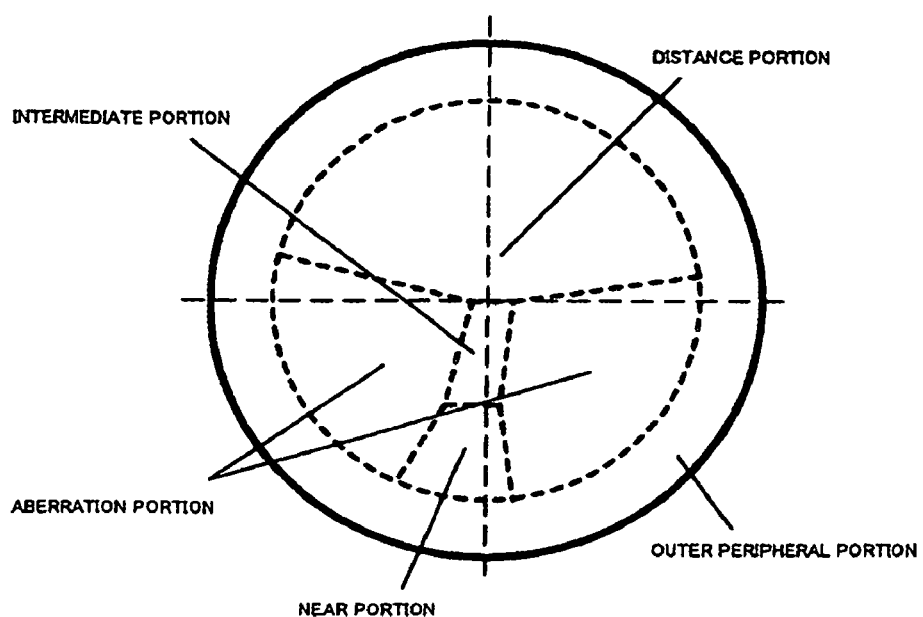
FIG. 8 illustrates a concept of a progressive-power lens.
Figure 9:
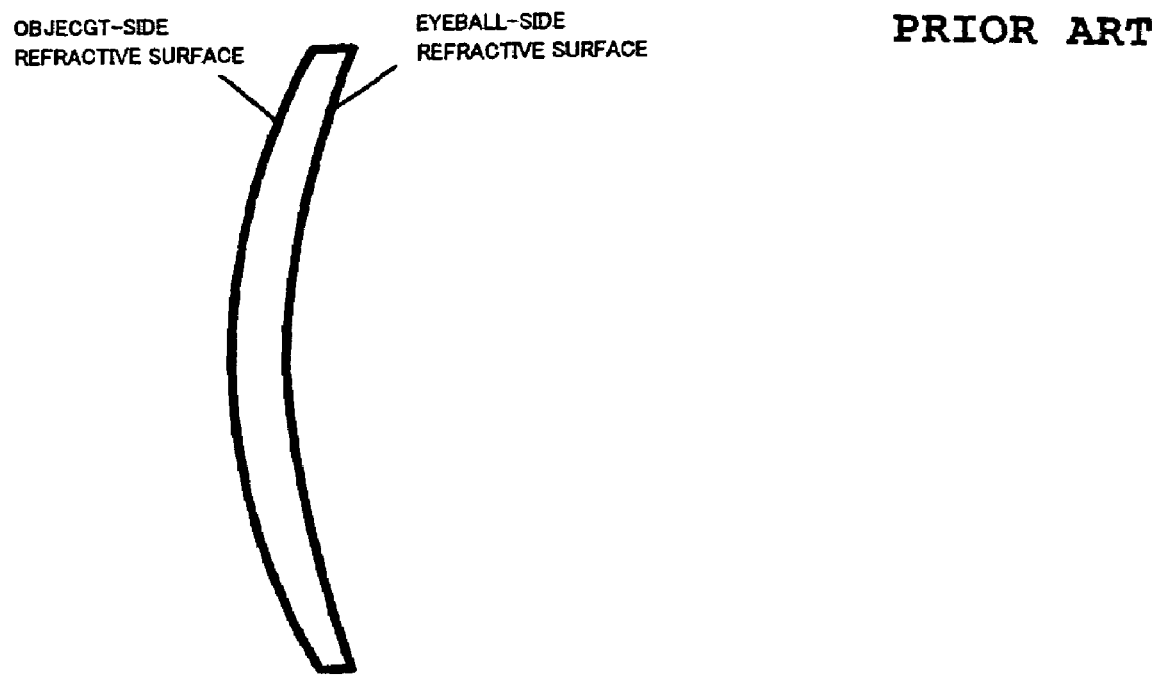
FIG. 9 is a cross-sectional view of a spectacle lens.
Figure 10:
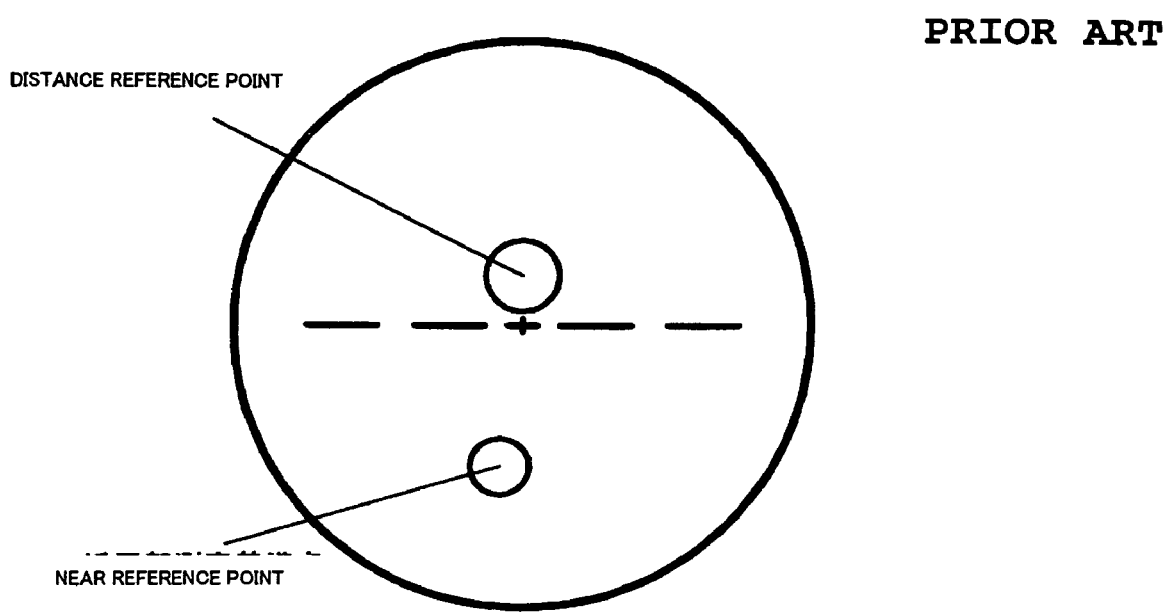
FIG. 10 illustrates a layout of a progressive-power lens.
Figure 11:
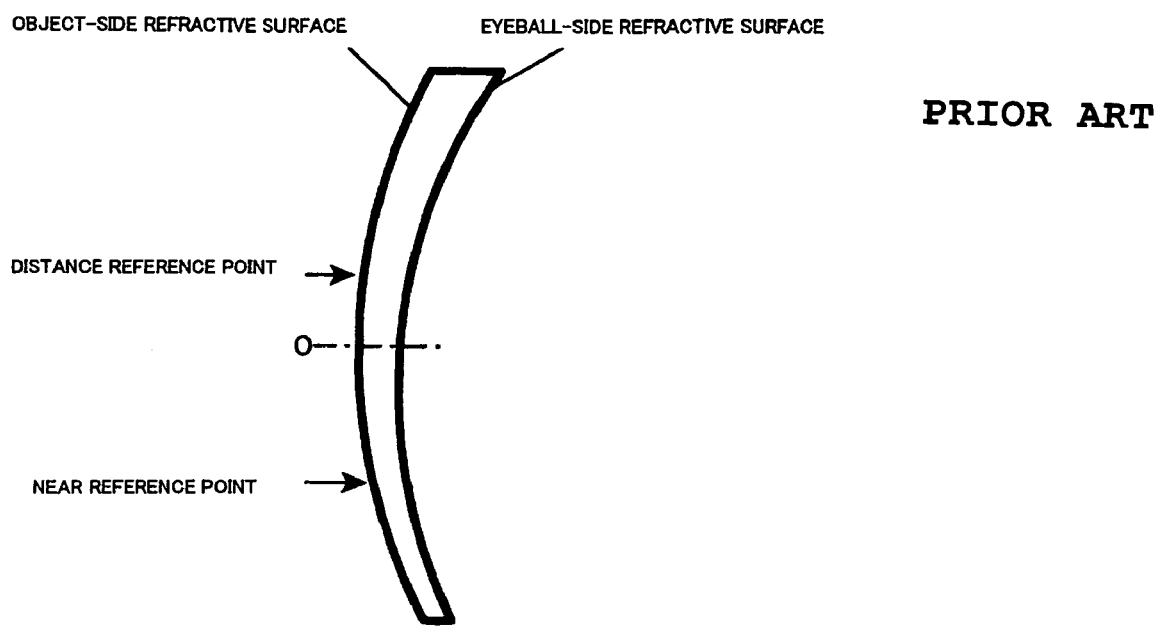
FIG. 11 shows a concept of an outside surface progressive-power lens.
Figure 12:
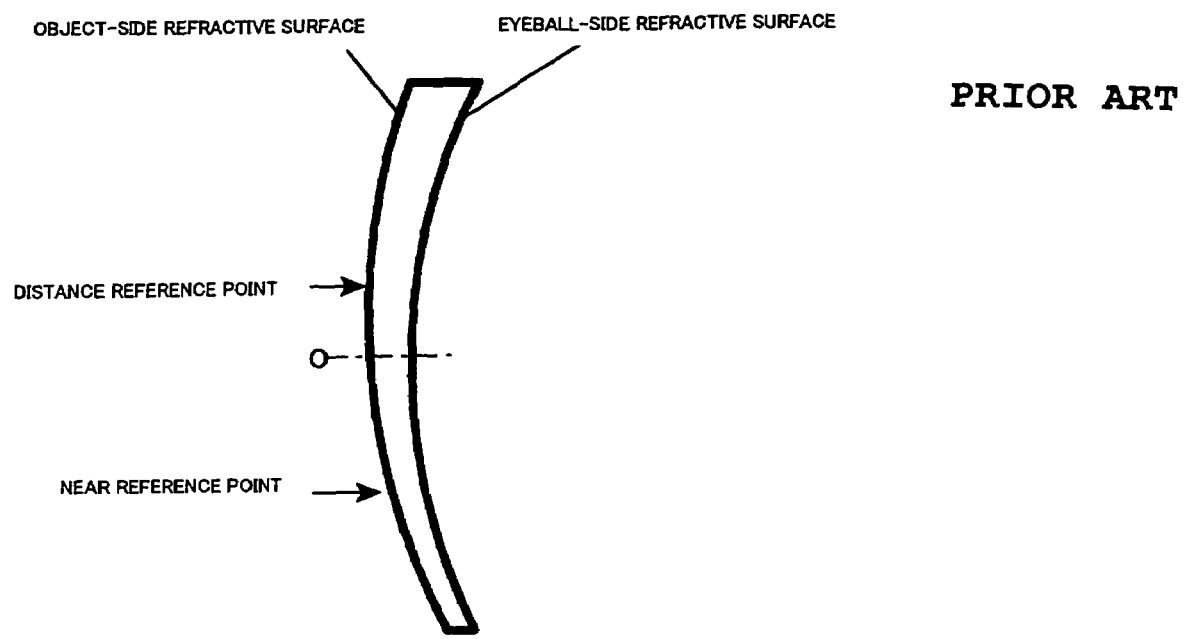
FIG. 12 shows a concept of an inside surface progressive-power lens.

FIG. 7 shows curvature variation in a sixth embodiment. In this embodiment, a rotational shaft is so designed as to pass a distance reference point.

In the preceding embodiments of the invention, descriptions have been made using figures of curvature variation but not giving specific figures. This is because curvatures of a spectacle lens as references for an object-side refractive surface are variably established in accordance with prescribed dioptric power. Since such specified reference values are not included in the scope of the invention, only variations in curvature have been shown. Curvature difference between distance and near reference points may be set at any value. Curvatures at any positions other than the near reference point and its vicinity are preferably smaller than the curvature at the near reference point. By setting those curvatures in this range, the height of the convex of the object-side refractive surface in the lens of the invention can be made smaller than in an inside surface progressive-power lens, providing improvement in appearance of the lens of the invention.

Additionally, the surface power at the distance reference point can be made smaller than that at the near reference point, which decreases the surface power difference of the eyeball-side refractive surface and thus improves image distortion. Similarly to an inside surface progressive-power lens available on the market, a corrective aspherical surface for providing cylindrical power and adjustment for "as-worn" conditions can be added to the eyeball-side refractive surface.

Moreover, effective improvement when the dioptric power at the distance portion power is positive has been described herein, but the invention can be applied when the dioptric power at the distance portion power is negative. For example, when the distance portion power is −6.00 D and the addition power is 3.00 D, the object-side refractive surface becomes a spherical surface having 1.00 D in an inside surface progressive-power lens. In the progressive-power lens of the invention, when an object-side refractive surface is formed from an aspherical surface symmetric with respect to a rotational axis and has the surface power of 1.00 D at the distance reference point and 2.00 D at the near reference point, the average surface power becomes larger than that of the inside surface progressive-power lens. As a result, the height of the convex of the object-side refractive surface increases, but the edge thickness of the lens decreases accordingly. The object-side refractive surface of the negative dioptric power lens originally has an almost flat shape, and increase in curvature to some extent does not degrade its appearance. Since the edge thickness is especially noticeable when the lens is fitted to the frame, there is a great demand for a thinner lens to be developed especially from those who use a lens having strongly negative dioptric power.

The invention claimed is:

1. A progressive-power lens comprising a distance portion, a near portion and an intermediate portion, wherein an object-side refractive surface is formed from a part of an aspherical surface symmetric with respect to a rotational axis and an eyeball-side refractive surface is from a progressive surface; characterized in that there is a relationship shown below between a curvature C1 at a distance reference point of the object-side refractive surface and a curvature C2 at a near reference point of the object-side refractive surface:

$$C1 < C2.$$

2. A progressive-power lens as set forth in claim 1, characterized in that there is a relationship shown below as to a curvature C3 at a portion outward from the near reference point of the object-side refractive surface:

$$C3 < C2.$$

3. A progressive-power lens as set forth in claim 1 or 2, characterized in that the eyeball-side refractive surface is formed from a progressive surface to which an aspherical surface element for correcting "as-worn" optical characteristics is added.

4. A progressive-power lens as set forth in claim 3, characterized in that the aspherical surface element for correcting the optical characteristics at the distance portion is different from that element at the near portion.

5. A progressive-power lens as set forth in claim 3, characterized in that the aspherical surface element is established considering any one of a vertex distance at the wearing of glasses, a pantoscopic angle at the wearing of glasses and a working distance.

6. A progressive-power lens as set forth in claim 1, characterized in that the eyeball-side refractive surface is formed from a progressive surface to which an astigmatism-corrective element is added.

7. A progressive-power lens as set forth in claim 1, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

8. A progressive-power lens as set forth in claim 1, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

9. A progressive-power lens as set forth in claim 4, characterized in that the aspherical surface element is established considering any one of a vertex distance at the wearing of glasses, a pantoscopic angle at the wearing of glasses and a working distance.

10. A progressive-power lens as set forth in claim 2, characterized in that the eyeball-side refractive surface is formed from a progressive surface to which an astigmatism-corrective element is added.

11. A progressive-power lens as set forth in claim 3, characterized in that the eyeball-side refractive surface is formed from a progressive surface to which an astigmatism-corrective element is added.

12. A progressive-power lens as set forth in claim 4, characterized in that the eyeball-side refractive surface is formed from a progressive surface to which an astigmatism-corrective element is added.

13. A progressive-power lens as set forth in claim 5, characterized in that the eyeball-side refractive surface is formed from a progressive surface to which an astigmatism-corrective element is added.

14. A progressive-power lens as set forth in claim 2, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

15. A progressive-power lens as set forth in claim 3, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

16. A progressive-power lens as set forth in claim 4, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

17. A progressive-power lens as set forth in claim 5, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

18. A progressive-power lens as set forth in claim 6, characterized in that curvature variation $\Delta C1$ of the object-side refractive surface satisfies a relationship shown below in a range of 5 mm in diameter from a center set at the distance reference point:

$$\Delta C1 \leq 0.25/(n-1)$$

wherein n indicates a refractive index of a lens base material.

19. A progressive-power lens as set forth in claim 2, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

20. A progressive-power lens as set forth in claim 3, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

21. A progressive-power lens as set forth in claim 4, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

22. A progressive-power lens as set forth in claim 5, characterized in that curvature variation $\Delta C2$ of the object-side refractive surface satisfies a relationship shown below in a range of 5mm in diameter from a center set at the near reference point:

$$\Delta C2 \leq 0.25/(n-1)$$

wherein n indicates a refractive index of a lens base material.

23. A progressive-power lens as set forth in claim 6, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

24. A progressive-power lens as set forth in claim 7, characterized in that curvature variation $\Delta C2$ of the object-side refractive surface satisfies a relationship shown below in a range of 5 mm in diameter from a center set at the near reference point:

$$\Delta C2 \leq 0.25/(n-1)$$

wherein n indicates a refractive index of a lens base material.

* * * * *